(12) United States Patent
Chen et al.

(10) Patent No.: US 9,350,407 B1
(45) Date of Patent: May 24, 2016

(54) INTERFACE CHIP AND CONTROL METHOD THEREFOR

(71) Applicant: VIA TECHNOLOGIES, INC., New Taipei (TW)

(72) Inventors: Shih-Hao Chen, New Taipei (TW); Chun-Heng Lin, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 14/837,412

(22) Filed: Aug. 27, 2015

(30) Foreign Application Priority Data

Jan. 30, 2015 (TW) .............................. 104103144 A

(51) Int. Cl.
*H04B 1/3816* (2015.01)
*H04L 29/08* (2006.01)

(52) U.S. Cl.
CPC ............ *H04B 1/3816* (2013.01); *H04L 69/323* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 6,034,623 A * | 3/2000 | Wandel | ..................... | H04Q 9/00 340/870.01 |
| 6,182,172 B1 * | 1/2001 | Schwan | .............. | G06F 13/4068 710/100 |
| 7,292,597 B2 * | 11/2007 | Mills | ....................... | H04L 12/12 370/433 |
| 7,317,691 B2 * | 1/2008 | Mills | ....................... | H04L 12/12 370/250 |
| 7,317,732 B2 * | 1/2008 | Mills | ....................... | H04L 12/12 370/445 |
| 7,752,351 B1 * | 7/2010 | Overby | ................ | G11B 19/042 710/32 |
| 7,941,660 B2 * | 5/2011 | Lu | ........................... | H04L 43/10 713/151 |
| 7,962,800 B2 * | 6/2011 | Hopkins | .................. | H04L 43/18 714/27 |
| 7,970,350 B2 * | 6/2011 | Sheynman | ........... | H04W 8/005 370/259 |
| 8,270,397 B2 * | 9/2012 | Berman | .................. | H04L 49/30 370/355 |
| 8,437,343 B1 * | 5/2013 | Wagh | .................... | G06F 13/385 370/359 |
| 8,553,753 B2 | 10/2013 | Hsieh et al. | | |
| 8,933,725 B2 | 1/2015 | Kuo | | |
| 8,947,377 B2 * | 2/2015 | Van Antwerpen | .... | G06F 3/0416 345/1.1 |
| 8,949,382 B2 * | 2/2015 | Cornett | ............... | H04L 41/0806 709/220 |
| 2004/0010625 A1 * | 1/2004 | Lo | ......................... | H04L 69/324 709/250 |
| 2004/0098608 A1 | 5/2004 | Teglia | | |
| 2008/0005366 A1 * | 1/2008 | Raatni | ..................... | G06F 13/24 710/8 |
| 2008/0019264 A1 * | 1/2008 | Lafleur | .............. | H04L 12/5601 370/217 |
| 2008/0282015 A1 * | 11/2008 | Bueti | .................. | G06F 13/4059 710/313 |
| 2012/0144240 A1 | 6/2012 | Rentschler et al. | | |

FOREIGN PATENT DOCUMENTS

| | | |
|---|---|---|
| TW | 201205232 | 2/2012 |
| TW | 201440432 | 10/2014 |

* cited by examiner

*Primary Examiner* — Tuan A Tran
(74) *Attorney, Agent, or Firm* — McClure, Qualey & Rodack, LLP

(57) ABSTRACT

An interface chip capable of accurate link detection. The interface chip mounted on a first electronic device has a link layer and a physical layer. The link layer outputs data to be transformed and transmitted to a second electronic device by the physical layer. The data transmitted from the second electronic device is received and transformed by the physical layer and then conveyed to the link layer. The link layer includes a state machine, which performs a state modification on the first electronic device to rescue the second electronic device from a trapped state for confirming a link between the first and second electronic devices, wherein data output by the link layer and transformed and transmitted to the second electronic device by the physical layer is changed according to the state modification.

14 Claims, 3 Drawing Sheets

INTERFACE CHIP AND CONTROL METHOD THEREFOR

CROSS REFERENCE TO RELATED APPLICATIONS

This Application claims priority of Taiwan Patent Application No. 104103144, filed on Jan. 30, 2015, the entirety of which is incorporated by reference herein.

BACKGROUND OF THE INVENTION

1. Field of the Invention

The present invention relates to a link detection function of an interface chip.

2. Description of the Related Art

An electronic device is usually equipped with an interface chip to communicate with another interface chip mounted on another electronic device to build a link between the two electronic devices.

However, there may be a great efficiency difference between the interface chips mounted on the different electronic devices, which may affect the link detection between the different electronic devices.

BRIEF SUMMARY OF THE INVENTION

A technology improving the link detection capability of an interface chip is discussed in this disclosure.

An interface chip in accordance with an exemplary embodiment of the disclosure includes a link layer and a physical layer. The interface chip is mounted on a first electronic device. The link layer outputs data to the physical layer to be transformed and transmitted to a second electronic device. The data transmitted from the second electronic device is received and transformed by the physical layer and then conveyed to the link layer. The link layer includes a state machine, which performs a state modification on the first electronic device to rescue the second electronic device from a trapped state for confirming a link between the first and second electronic devices. According to the state modification, data output by the link layer and transformed and transmitted to the second electronic device by the physical layer is changed and, accordingly, the second electronic device escapes from the trapped state and thereby the link between the first and second electronic device is confirmed.

A control method for an interface chip in accordance with an exemplary embodiment of the disclosure includes: analyzing data that a first electronic device equipped with the interface chip receives from a second electronic device when a link between the first electronic device and the second electronic device has not been confirmed; and, accordingly, driving a state machine of the interface chip mounted on the first electronic device to perform a state modification on the first electronic device to rescue the second electronic device from a trapped state for confirming the link between the first and second electronic devices. According to the state modification, data output by a link layer of the interface chip of the first electronic device and transformed and transmitted to the second electronic device by a physical layer of the interface chip of the first electronic device is changed and, accordingly, the second electronic device escapes from the trapped state and thereby the link between the first and second electronic device is confirmed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
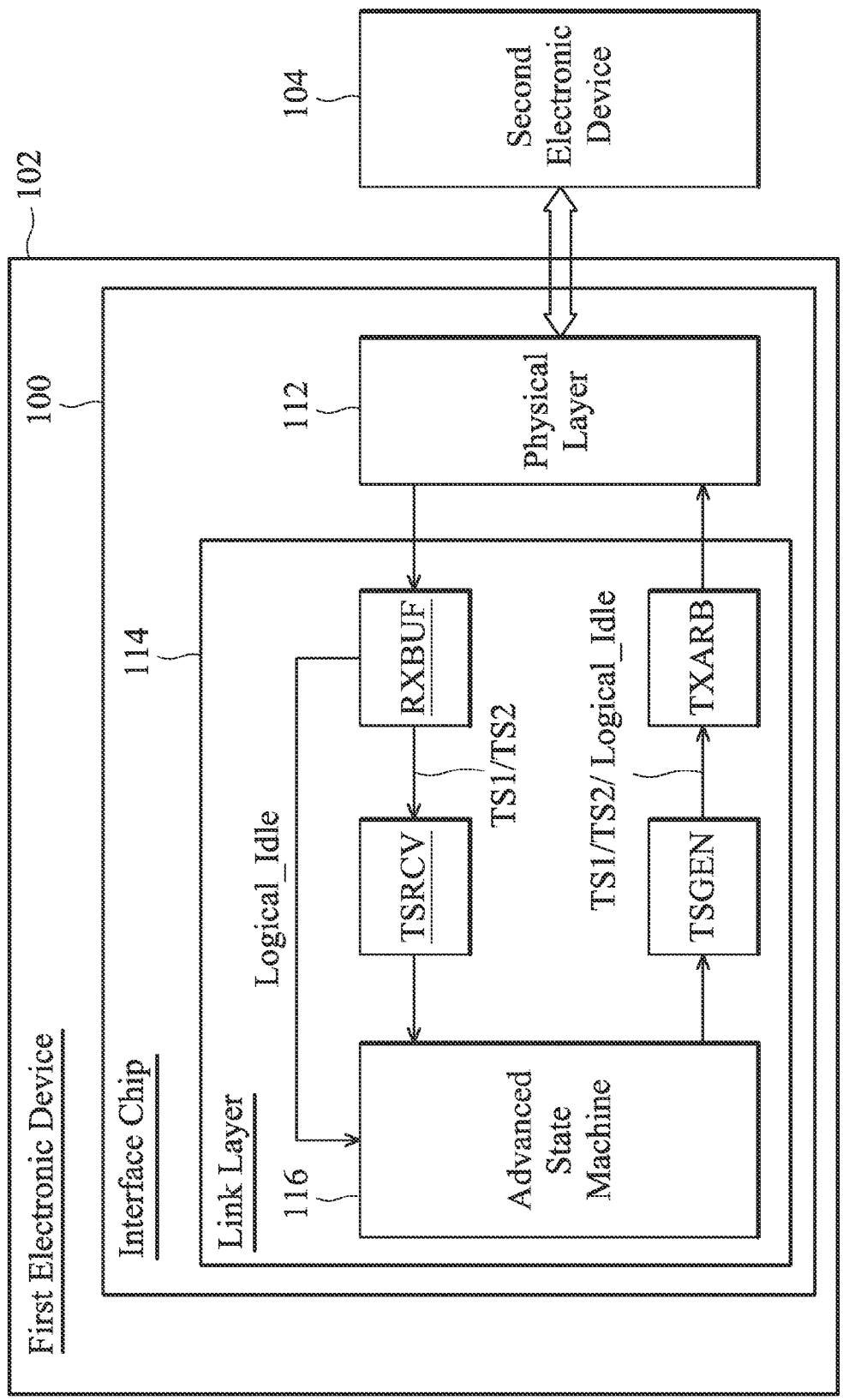
FIG. 1 is a block diagram depicting an interface chip 100 in accordance with an exemplary embodiment of the disclosure.

FIG. 1 is a block diagram depicting an interface chip 100 in accordance with an exemplary embodiment of the disclosure. The interface chip 100 is mounted on a first electronic device 102. The first electronic device 102 is connected to a second electronic device 104. The interface chip 100 has a physical layer (e.g., including a logical physical layer and an electrical physical layer) 112 and a link layer 114. The link layer 114 outputs data to the physical layer 112 to be transformed and transmitted to the second electronic device 104 by the physical layer 112. Furthermore, data transmitted from the second electronic device 104 is received and transformed by the physical layer 112 and then conveyed to the link layer 114. The link layer 114 has a state machine 116 (named advanced state machine) adaptive to different connection fail problems. The state machine 116 performs state modification on the first electronic device 102 in response to the trapped state of the second electronic device. The second electronic device 104 may have a design that is similar to the first electronic device 102 shown in FIG. 1, or, in another exemplary embodiment, the interface chip mounted on the second electronic device 104 may not be adaptive to the different connection fail problems. By performing the aforementioned state modification, the state machine 116 modifies the state of the first electronic device 102 to modify the data that the link layer 114 provides to the physical layer 112 for transformation and transmission and thereby the second electronic device 104 receiving the data output from the first electronic device 102 is rescued from the trapped state and a link between the first and second electronic devices 102 and 104 is confirmed. This means that the previous state (before the state modification) is different from the modified state (after the state modification). In an exemplary embodiment, the modified state is an expected next state of the previous state. In another exemplary embodiment, the modified state is the state immediately prior to the previous state. According to the disclosure, the second electronic device 104 is no longer trapped in a certain state and the link between the first electronic device 102 and the second electronic device 104 can be successfully confirmed.

In the exemplary embodiment of FIG. 1, the link layer 114 includes a buffer RXBUF, a receiver TSRCV, a data generator TSGEN and an attributer TXARB.

The data transmitted from the second electronic device 104 and received and transformed by the physical layer 112 is collected in the buffer RXBUF. A first training sequence TS1 or a second training sequence TS2 of a training sequence ordered set or a logical idle sequence Logical_Idle may be recognized from the collected data. The receiver TSRCV analyzes the received first and second training sequence TS1 and TS2 and counts the number of received first training sequence TS1 and the number of received second training sequence TS2. The state machine 116 is operated according to the information (i.e. the logical idle sequence Logical_Idle or series of the first training sequence TS1 or series of the second training sequence TS2) retrieved from the data transmitted from the second electronic device 104.

The state machine 116 further operates the data generator TSGEN to generate the logical idle sequence Logical_Idle, the first training sequence TS1 and the second training sequence TS2 with respect to how the state machine 116 controls the state of the first electronic device 102. The logical idle sequence Logical_Idle, the first training sequence TS1 and the second training sequence TS2 generated by the data generate TSGEN are scheduled by the attributer TXARB and then conveyed to the physical layer 112 to be transformed and transmitted to the second electronic device 104.

Figure 2:
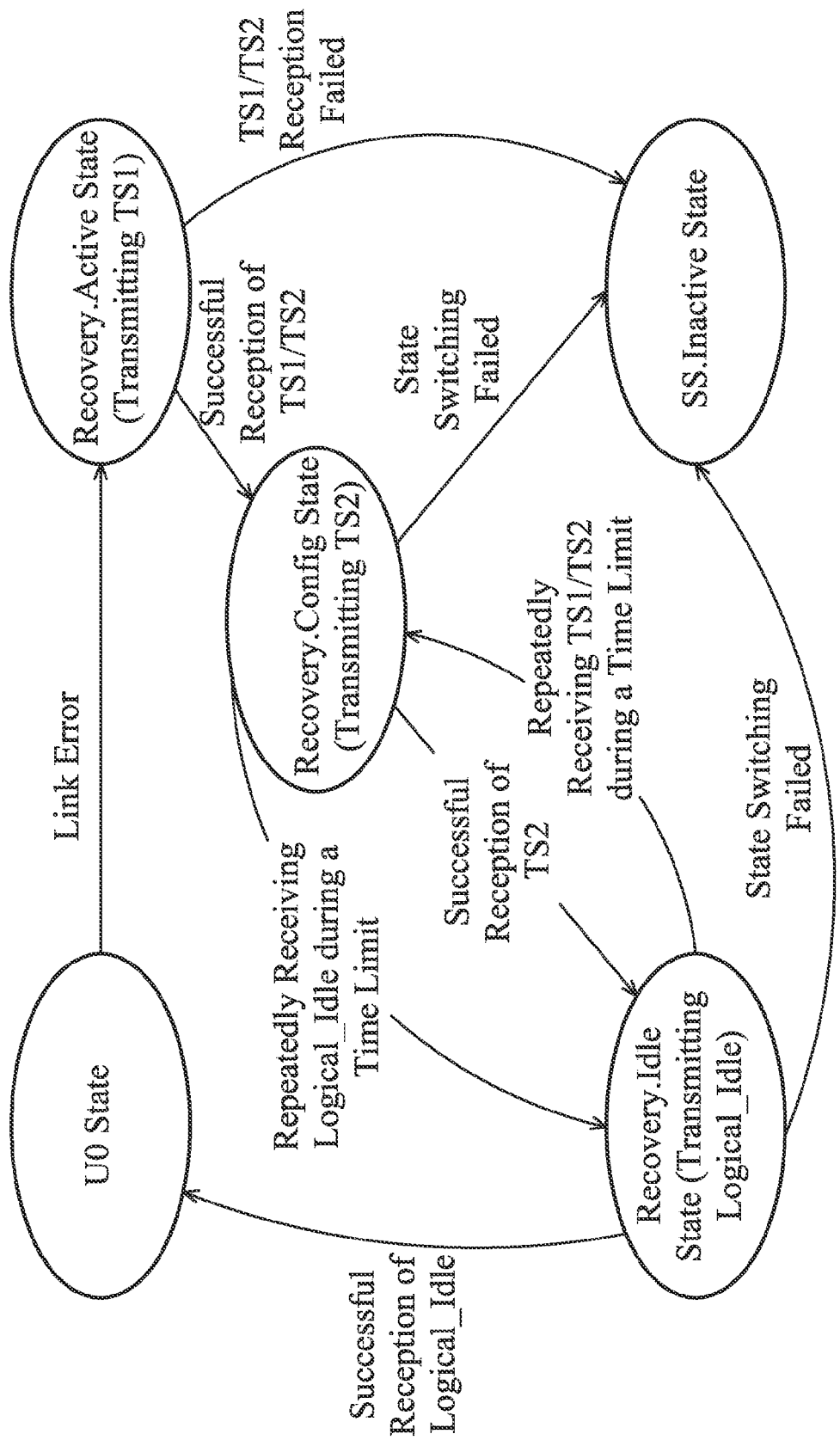
FIG. 2 is a state diagram showing the link recovery between the first and second electronic devices 102 and 104 and how the state machine 116 switches the state of the first electronic device 102.

FIG. 2 is a state diagram showing the link recovery between the first and second electronic devices 102 and 104 and how the state machine 116 switches the state of the first electronic device 102.

As shown in FIG. 2, there are a normal operation state (U0), an active state (Recovery.Active), a configure state (Recovery.Config), an idle state (Recovery.Idle) and an inactive state (SS.Inactive) defined for link recovery. In the following, it is discussed from the point of view of the first electronic device 102 to show how the state machine 116 controls the state of the first electronic device 102 when the communication interface is USB 3.0/USB 3.1.

The first electronic device 102 is operated in the normal state U0 when the link between the first electronic device 102 and the second electronic device 104 has been confirmed. When a link error (e.g. poor signal between the first and second electronics 102 and 104) happens, the first electronic device 102 is switched to the active state Recovery.Active to repeatedly output the first training sequence TS1 to the second electronic device 104. When the first electronic device 102 in the active state Recovery.Active successfully confirms the reception of the first training sequence TS1 or the second training sequence TS2 transmitted from the second electronic device 104 (e.g., repeatedly receiving the first training sequence TS1 from the second electronic device 104 or repeatedly receiving the second training sequence TS2 from the second electronic device 104 during a time limit depending on the communication interface), the first electronic device 102 is switched to the configure state Recovery.Config to repeatedly output the second training sequence TS2 to the second electronic device 104. When the first electronic device 102 in the configure state Recovery.Config successfully confirms the reception of the second training sequence TS2 transmitted from the second electronic device 104 (e.g., repeatedly receiving the second training sequence TS2 from the second electronic device 104 during a time limit depending on the communication interface), the first electronic device 102 is switched to the idle state Recovery.Idle to repeatedly output the logical idle sequence Logical.Idle to the second electronic device 104. When the first electronic device 102 in the idle state Recovery.Idle successfully confirms the reception of the logical idle sequence Logical_Idle transmitted from the second electronic device 104 (e.g., repeatedly receiving the logical idle sequence Logical_Idle from the second electronic device 104 during a time limit depending on the communication interface), the first electronic device 102 is switched to the normal operation state U0 and the link between the first and second electronic devices 102 and 104 is confirmed. The link confirmation means that the first and second electronic devices 102 and 104 both enter the normal operation state U0 within a time limit depending on the communication interface.

When the first electronic device 102 in the configure state Recover.Config fails to receive the second training sequence TS2 from the second electronic device 104, the first electronic device 102 may be switched to the idle state Recovery.Idle in another condition. The first electronic device 102 in the configure state Recover.Config is further switched to the idle state Recovery.Idle by the state machine 116 when the second electronic device 104 repeatedly transmits the logical idle sequence Logical_Idle to the first electronic device 102 during a time limit depending on the communication interface. In this manner, the first electronic device 102 switched to the idle state Recovery.Idle repeatedly transmits the logical idle sequence Logical_Idle to the second electronic device 104 and thereby the second electronic device 104 trapped in the idle state Recovery.Idle waiting for the logical idle sequence Logical_Idle from the first electronic device 102 and repeatedly transmitting the logical idle sequence Logical_Idle itself escapes from the idle state Recovery.Idle and is successfully switched to the normal operation state U0. In an exemplary embodiment, it is checked whether the first electronic device 102 in the configure state Recovery.Config repeatedly receives the logical idle sequence Logical_Idle from the second electronic device 104 during Bus (or other time limits dependent on the communication interface). In this exemplary embodiment, the data that the first electronic device 102 transmits in the configure state Recovery.Config is different from the data that the first electronic device 102 transmits in the idle state Recovery.Idle. Under ideal conditions, an electronic device (e.g. 102 or 104) is switched from the configure state Recovery.Config to the normal operation state U0 by switching to the idle state Recovery.Idle first.

Furthermore, when the first electronic device 102 in the idle state Recover.Idle fails to receive the logical idle sequence Logical_Idle from the second electronic device 104 but a specific condition is satisfied, the first electronic device 102 is switched back to the configure state Recovery.Config. The first electronic device 102 in the idle state Recover.Idle is switched back to the configure state Recovery.Config by the state machine 116 when the second electronic device 104 repeatedly transmits the second training sequence TS2 to the first electronic device 102 during a time limit depending on the communication interface. In this manner, the first electronic device 102 switched to the configure state Recovery.Config repeatedly transmits the second training sequence TS2 to the second electronic device 104 and thereby the second electronic device 104 trapped in the configure state Recovery.Config waiting for the second training sequence TS2 from the first electronic device 102 and repeatedly transmitting the second training sequence TS2 itself escapes from the configure state Recovery.Config and is successfully switched to the idle state Recovery.Idle. In an exemplary embodiment, it is checked whether the first electronic device 102 in the idle state Recovery.Idle repeatedly receives the second training sequence TS2 from the second electronic device 104 during 40~80 μs (or other time limits dependent on the communication interface). In some exemplary embodiments, the state machine of the second electronic device 104 not shown in the figure is not adaptive to connection fail problems as the advanced state machine 116, which means that the state machine of the second electronic device 104 is incapable of automatically modifying the state of the second electronic device 104 to rescue the first electronic device 102 from the trapped state. When the second electronic device 104 is in the configure state Recovery.Config and the first electronic device 102 is in the idle state Recovery.Idle, the second electronic device 104 is trapped in the configure state Recovery.Config until the advanced state machine 116 of the first electronic device 102 switches the state of the first electronic device 102 for this connection fail problem. In this exemplary embodiment, the data that the first electronic device 102 transmits in the configure state Recovery.Config is different from the data that the first electronic device 102 transmits in the idle state Recovery.Idle. Under ideal conditions, an electronic device (e.g. 102 or 104) is switched from the configure state Recovery.Config to the normal operation state U0 by switching to the idle state Recovery.Idle first.

In another exemplary embodiment, when the first electronic device 102 in the idle state Recover.Idle fails to receive the logical idle sequence Logical_Idle from the second electronic device 104 but another specific condition is satisfied, the first electronic device 102 is switched back to the configure state Recovery.Config. The first electronic device 102 in the idle state Recover.Idle is switched back to the configure state Recovery.Config by the state machine 116 when the second electronic device 104 repeatedly transmits the first training sequence TS1 to the first electronic device 102 during a time limit depending on the communication interface. In this manner, the first electronic device 102 switched to the configure state Recovery.Config repeatedly transmits the second training sequence TS2 to the second electronic device 104 and thereby the second electronic device 104 trapped in the active state Recovery.Active waiting for the first or second training sequence TS1 or TS2 from the first electronic device 102 and repeatedly transmitting the first training sequence TS1 itself escapes from the active state Recovery.Active and is successfully switched to the configure state Recovery.Con-FIG. In an exemplary embodiment, it is checked whether the first electronic device 102 in the idle state Recovery.Idle repeatedly receives the first training sequence TS1 from the second electronic device 104 during 40~80 μs (or other time limits dependent on the communication interface). In some exemplary embodiments, the state machine of the second electronic device 104 not shown in the figure is not adaptive to connection fail problems as the advanced state machine 116, which means that the state machine of the second electronic device 104 is incapable of automatically modifying the state of the second electronic device 104 to rescue the first electronic device 102 from the trapped state. When the second electronic device 104 is in the active state Recovery.Active and the first electronic device 102 is in the idle state Recovery.Idle, the second electronic device 104 is trapped in the active state Recovery.Active until the advanced state machine 116 of the first electronic device 102 switches the state of the first electronic device 102 for this connection fail problem. In this exemplary embodiment, the data that the first electronic device 102 transmits in the configure state Recovery.Config is different from the data that the first electronic device 102 transmits in the idle state Recovery.Idle. Under ideal conditions, an electronic device (e.g. 102 or 104) in the active state Recovery.Active is switched to the normal operation state U0 by first switching to the configure state Recovery.Config and then switching to the idle state Recovery.Idle and finally switching to the normal operation state U0.

It is further shown in FIG. 2 that when the first electronic device 102 in the active state Recovery.Active, or the configure state Recovery.Config, or the idle state Recovery.Idle fails to satisfy the corresponding state modification conditions depicted in the figure, the first electronic device 102 is switched to the inactive state SS.Inactive.

Figure 3:
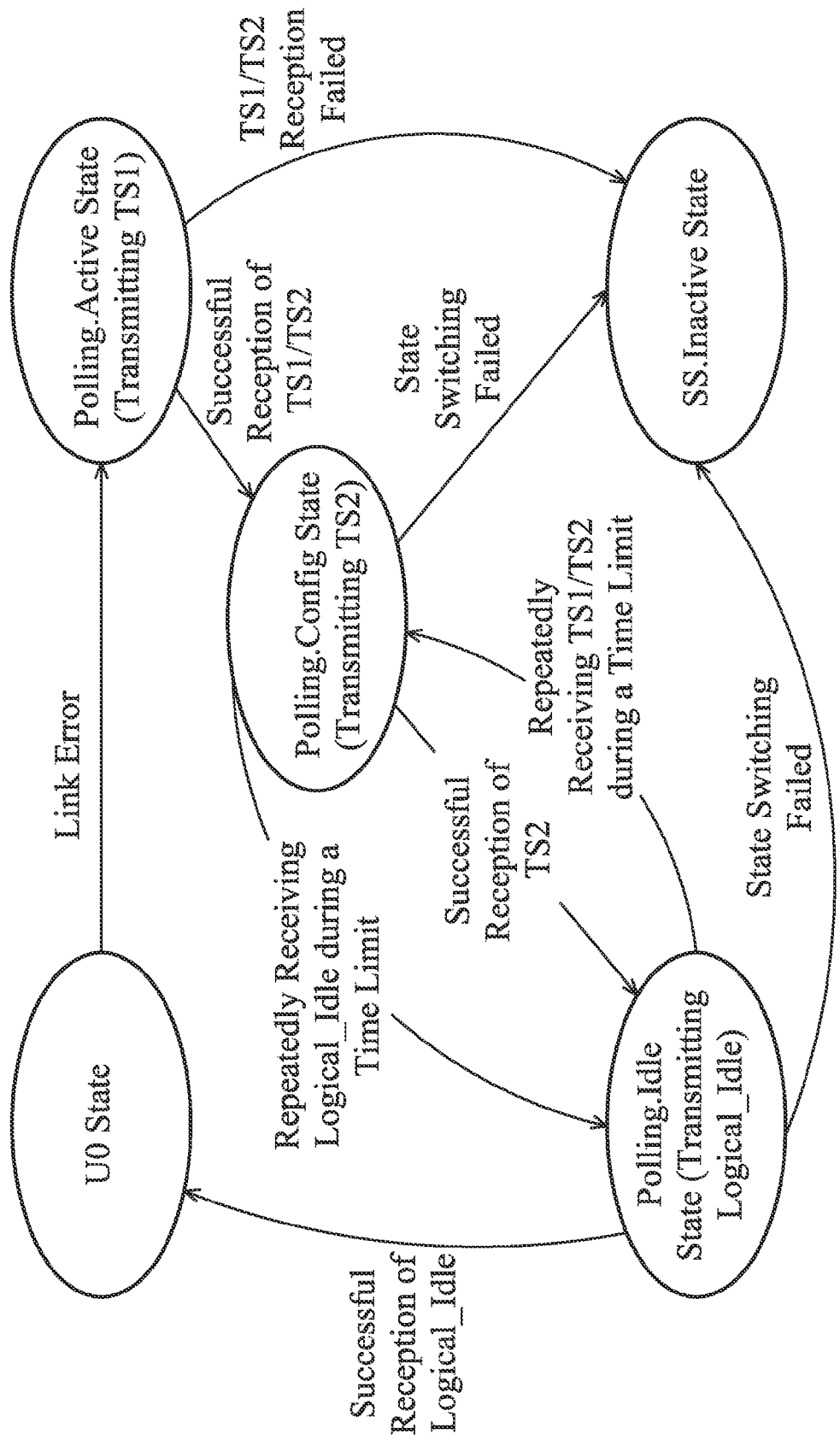
FIG. 3 is a state diagram showing how the state machine 116 switches the state of the first electronic device 102 during a polling process between the first and second electronic devices 102 and 104.

Similar to the link recovery design of FIG. 2, an electronic device is further switched between an active state Polling.Active, a configure state Polling.Config and an idle state Polling.Idle for a polling process. FIG. 3 is a state diagram showing how the state machine 116 switches the state of the first electronic device 102 during a polling process between the first and second electronic devices 102 and 104. As shown, the state machine 116 controls the first electronic device 102 to switch between the normal operation state U0, the active state Polling.Active, the configure state Polling.Config, the idle state Polling.Idle and the inactive state SS.Inactive according to the similar concept of state control shown in FIG. 2.

Any technology improving a link detection capability (in a link recovery process or a polling process) of an interface chip in accordance with the aforementioned concept is within the scope of the invention. A control method for an interface chip has also been developed based on the aforementioned techniques.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interface chip to be mounted on a first electronic device, comprising:
    a physical layer; and
    a link layer, outputting data to the physical layer to be transformed and transmitted to a second electronic device by the physical layer,
    wherein:
    the physical layer further receives data transmitted from the second electronic device and transforms and conveys the data transmitted from the second electronic device to the link layer;
    the link layer comprises a state machine which performs a state modification on the first electronic device to rescue the second electronic device from a trapped state for confirming a link between the first and second electronic devices and, according to the state modification, data output by the link layer and transformed and transmitted to the second electronic device by the physical layer is changed to rescue the second electronic device from the trapped state.

2. The interface chip as claimed in claim 1, wherein:
    when the first electronic device is in a configure state and the second electronic device repeatedly transmits a logical idle sequence to the first electronic device during a time limit, the state machine switches the first electronic device to an idle state waiting to be switched a normal operation state; and
    the first electronic device switched to the idle state repeatedly transmits the logical idle sequence to the second electronic device and thereby the second electronic device trapped in the idle state and repeatedly transmitting the logical idle sequence to the first electronic device is rescued from the idle state and switched to the normal operation state.

3. The interface chip as claimed in claim 2, wherein:
the first electronic device repeatedly transmits a first training sequence when the first electronic device is in an active state scheduled prior to the configure state;
the first electronic device repeatedly transmits a second training sequence when the first electronic device is in the configure state; and
the first training sequence and the second training sequence belong to a training sequence ordered set.

4. The interface chip as claimed in claim 1, wherein:
a first training sequence and a second training sequence are defined as belonging to a training sequence ordered set;
when the first electronic device is in an idle state scheduled prior to a normal operation state and the second electronic device repeatedly transmits the second training sequence to the first electronic device during a time limit, the state machine switches the first electronic device to a configure state; and
the first electronic device switched to the configure state repeatedly transmits the second training sequence to the second electronic device and thereby the second electronic device trapped in the configure state and repeatedly transmitting the second training sequence to the first electronic device is rescued from the configured state and switched to the idle state.

5. The interface chip as claimed in claim 4, wherein:
the first electronic device repeatedly transmits a logical idle sequence when the first electronic device is in the idle state; and
the first electronic device repeatedly transmits the first training sequence when the first electronic device is in an active state scheduled prior to the configure state.

6. The interface chip as claimed in claim 1, wherein:
a first training sequence and a second training sequence are defined as belonging to a training sequence ordered set;
when the first electronic device is in an idle state scheduled prior to a normal operation state and the second electronic device repeatedly transmits the first training sequence to the first electronic device during a time limit, the state machine switches the first electronic device to a configure state; and
the first electronic device switched to the configure state repeatedly transmits the second training sequence to the second electronic device and thereby the second electronic device trapped in an active state and repeatedly transmitting the first training sequence to the first electronic device is rescued from the active state and switched to the configure state.

7. The interface chip as claimed in claim 6, wherein:
the first electronic device repeatedly transmits a logical idle sequence when the first electronic device is in the idle state.

8. A control method for an interface chip, comprising:
analyzing data that a first electronic device equipped with the interface chip receives from a second electronic device when a link between the first electronic device and the second electronic device has not been confirmed; and
based on the data transmitted from the second electronic device before the link between the first electronic device and the second electronic device is confirmed, driving a state machine of the interface chip mounted on the first electronic device to perform a state modification on the first electronic device to rescue the second electronic device from a trapped state for confirming the link between the first and second electronic devices,
wherein, according to the state modification, data output by a link layer of the interface chip and transformed and transmitted to the second electronic device by a physical layer of the interface chip is changed to rescue the second electronic device from the trapped state.

9. The control method as claimed in claim 8, wherein:
when the first electronic device is in a configure state and the second electronic device repeatedly transmits a logical idle sequence to the first electronic device during a time limit, the state machine switches the first electronic device to an idle state waiting to be switched to a normal operation state; and
the first electronic device switched to the idle state repeatedly transmits the logical idle sequence to the second electronic device and thereby the second electronic device trapped in the idle state and repeatedly transmitting the logical idle sequence to the first electronic device is rescued from the idle state and switched to the normal operation state.

10. The control method as claimed in claim 9, wherein:
the first electronic device repeatedly transmits a first training sequence when the first electronic device is in an active state scheduled prior to the configure state;
the first electronic device repeatedly transmits a second training sequence when the first electronic device is in the configure state; and
the first training sequence and the second training sequence belong to a training sequence ordered set.

11. The control method as claimed in claim 8, wherein:
a first training sequence and a second training sequence are defined as belonging to a training sequence ordered set;
when the first electronic device is in an idle state scheduled prior to a normal operation state and the second electronic device repeatedly transmits the second training sequence to the first electronic device during a time limit, the state machine switches the first electronic device to a configure state; and
the first electronic device switched to the configure state repeatedly transmits the second training sequence to the second electronic device and thereby the second electronic device trapped in the configure state and repeatedly transmitting the second training sequence to the first electronic device is rescued from the configured state and switched to the idle state.

12. The control method as claimed in claim 11, wherein:
the first electronic device repeatedly transmits a logical idle sequence when the first electronic device is in the idle state; and
the first electronic device repeatedly transmits the first training sequence when the first electronic device is in an active state scheduled prior to the configure state.

13. The control method as claimed in claim 8, wherein:
a first training sequence and a second training sequence are defined as belonging to a training sequence ordered set;
when the first electronic device is in an idle state scheduled prior to a normal operation state and the second electronic device repeatedly transmits the first training sequence to the first electronic device during a time limit, the state machine switches the first electronic device to a configure state; and
the first electronic device switched to the configure state repeatedly transmits the second training sequence to the second electronic device and thereby the second electronic device trapped in an active state and repeatedly transmitting the first training sequence to the first electronic device is rescued from the active state and switched to the configure state.

14. The control method as claimed in claim 13, wherein:
the first electronic device repeatedly transmits a logical idle sequence when the first electronic device is in the idle state.

\* \* \* \* \*